United States Patent
Solis et al.

(10) Patent No.: US 8,000,267 B2
(45) Date of Patent: Aug. 16, 2011

(54) NETWORK ROUTING WITH PATH IDENTIFIERS

(75) Inventors: Ignacio Solis, Santa Cruz, CA (US); Jose J. Garcia-Luna-Aceves, San Mateo, CA (US); Rebecca L. Braynard Silberstein, Sunnyvale, CA (US)

(73) Assignee: Palo Alto Research Center Incorporated, Paio Alto, CA (US)

( * ) Notice: Subject to any disclaimer, the term of this patent is extended or adjusted under 35 U.S.C. 154(b) by 247 days.

(21) Appl. No.: 12/391,841

(22) Filed: Feb. 24, 2009

(65) Prior Publication Data

US 2010/0215051 A1    Aug. 26, 2010

(51) Int. Cl.
H04L 12/28    (2006.01)
(52) U.S. Cl. .................... 370/256; 370/351; 370/389
(58) Field of Classification Search ............... None
See application file for complete search history.

(56) References Cited

U.S. PATENT DOCUMENTS

| | | | | |
|---|---|---|---|---|
| 5,724,512 A * | 3/1998 | Winterbottom | ............... | 709/226 |
| 6,618,755 B1 * | 9/2003 | Bonn | ............... | 709/223 |
| 6,801,534 B1 * | 10/2004 | Arrowood et al. | ............... | 370/400 |
| 2002/0035602 A1 * | 3/2002 | Garcia-Luna-Aceves et al. | ............... | 709/204 |
| 2002/0067720 A1 * | 6/2002 | Garcia-Luna-Aceves et al. | ............... | 370/389 |
| 2004/0039839 A1 * | 2/2004 | Kalyanaraman et al. | ...... | 709/238 |
| 2008/0101244 A1 * | 5/2008 | Liu et al. | ............... | 370/238 |

* cited by examiner

*Primary Examiner* — Chirag G Shah
*Assistant Examiner* — Salvador E Rivas
(74) *Attorney, Agent, or Firm* — Park, Vaughan, Fleming & Dowler LLP; Shun Yao

(57) ABSTRACT

One embodiment of the present invention provides a system that communicates a data packet in a network to a target node. In doing so, the system receives a node identifier for the target node, and determines a first positional label, based in part on the node identifier, for reaching a first anchor node from a root node in the network. The first anchor node stores a second positional label for reaching the target node from the root node in the network, which comprises a number of nodes coupled to the root node in a tree topology. The system then retrieves the second positional label from the first anchor node, and communicates the data packet to the target node based in part on the second positional label.

20 Claims, 10 Drawing Sheets

NETWORK ROUTING WITH PATH IDENTIFIERS

STATEMENT REGARDING FEDERALLY SPONSORED RESEARCH OR DEVELOPMENT

This invention was made with government support under FA8750-07-C-0169 awarded by DARPA. The government has certain rights in the invention.

BACKGROUND

1. Field

The present disclosure generally relates to packet routing within a computer network. More specifically, the present disclosure relates to techniques and systems for implementing an optimal routing protocol using fixed-length positional labels.

2. Related Art

Mobile Ad hoc NETworks (MANETs) are becoming increasingly popular as mobile computing becomes an integral part of the modern lifestyle. Furthermore, there are an increasing number of scientific applications for wireless sensor nodes, which employ MANETs as their communication framework. Unfortunately, MANETs frequently experience runtime issues associated with lossy links, constrained resources, and other complications due to node mobility. These runtime issues can create a challenge for successfully deploying MANETs capable of achieving a dependable performance level.

As with any network protocol, routing in MANETs is subject to various types of overhead, which can influence how a communication protocol is designed and implemented for a given MANET. These overhead considerations impose design tradeoffs, such as runtime performance versus signaling overhead, which need to be considered specifically for a given MANET application. For example, a MANET architect currently has to determine whether the MANET application could benefit from proactive routing (i.e., maintain path information for other nodes at all times), or reactive routing (i.e., determine routes only when they are needed), or if the MANET application requires a customized network protocol which combines proactive routing and reactive routing.

When implementing a routing protocol, network architects are typically concerned with methods for storing and disseminating path information. There are currently two dominant routing techniques implemented for computer networks. In a first routing technique, path information for reaching a destination node is placed within the packet header of a data packet. The packet header includes the locations (i.e., node identifiers) for all nodes in the path to the destination node. This technique is viable for small networks that do not form long acyclic paths, but suffers from overhead issues with networks that have a large node density and/or diameter. First, as the number of nodes in a network increases, the node identifiers for the nodes also need to increase in size. Second, as the network increases in size, the length of the header path will also increase. These two overhead issues can require a packet to increase in size, or require more packets for communicating a given amount of data, as the number of computing nodes in a computer network increases.

In a second routing technique, path information for reaching a destination node is stored at each node in the path. This technique can be implemented by constructing a decision table at each node which identifies a subsequent node along a path toward a given destination node. This technique is viable for small networks, but also suffers from overhead issues for large networks. First, large networks require large decision tables at each node. Second, large networks cause the nodes to experience a large signaling overhead for maintaining the network state information at each node. These two overhead issues can cause a memory overhead, or cause performance degradation at a respective node, as a network increases in size.

SUMMARY

One embodiment of the present invention provides a system that communicates a data packet across a network to a target node. In doing so, the system receives a node identifier for the target node, and determines a first positional label, based in part on the node identifier, for reaching a first anchor node from a root node in the network. The first anchor node stores a second positional label for reaching the target node from the root node in the network, and the network comprises a number of nodes coupled to the root node in a tree topology. The system then retrieves the second positional label from the first anchor node, and communicates the data packet to the target node based in part on the second positional label.

In a variation on this embodiment, a positional label facilitates computing a routing path from the root node to a corresponding destination node. The positional label comprises a path identifier and a path distance value. The path identifier of the positional label is used by a respective node on the routing path to determine a corresponding child node that is on the routing path. Furthermore, the path distance value of the positional label specifies a distance along the routing path to reach the destination node from the root node.

In a further variation, the system communicates the data packet to the target node by first determining whether the first node is on a routing path associated with the second positional label. If the first node is not on a routing path toward the target node, the system communicates the data packet to its parent node. Otherwise, if it is on the routing path, and its distance from the root node is equal to the path distance specified by the second positional label, the system accepts the data packet. Otherwise, the system communicates the data packet to a child node that is on the routing path associated with the second positional label. To do so, the system first identifies the child node by inputting the path identifier of the second positional label into a first hash function.

In a further variation, the system determines whether the first node is on the routing path associated with the second positional label by determining whether its parent node is the root node, or its parent node is on the routing path associated with the second positional label. The system also determines whether its distance from the root node is less than or equal to the path distance specified by the second positional label. Furthermore, the system determines whether the first hash function of the parent node identifies the system as the receiving child node when the path identifier of the second positional label is provided as input.

In a variation on this embodiment, the system can operate as an anchor node to provide the second positional label to a source node. In doing so, the system receives the node identifier from the source node, and inputs the node identifier into a second hash function to receive the second positional label. Then, the system communicates the second positional label to the source node.

In a variation on this embodiment, the system determines the first positional label for the first anchor node by inputting the node identifier into a hash function, which is a global hash function accessible to the number of nodes in the network.

In a further variation, the system can allow a second node to join the network. In doing so, the system selects a node in the network which is capable of communicating with the second node, and designates this network node as a parent for the second node. Next, the system gathers ancestry information from the parent, which includes positional labels for the set of nodes on a routing path from the root to the parent. Then, the system computes a third positional label, based in part on the ancestry information, for reaching the second node from the root. The system also determines a fourth positional label, by inputting a node identifier for the second node into the hash function, for reaching a second anchor node from the root in the network. The system then stores the node identifier for the second node and the third positional label at the second anchor node.

TABLE 1 illustrates an addressing table in accordance with an embodiment of the present invention.

TABLE 2 presents a pseudocode description for a basic routing algorithm in accordance with an embodiment of the present invention.

TABLE 3 presents a pseudocode description for a function which determines whether a node N is on a routing path associated with the pathID of a positional label L in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

Figure 1:
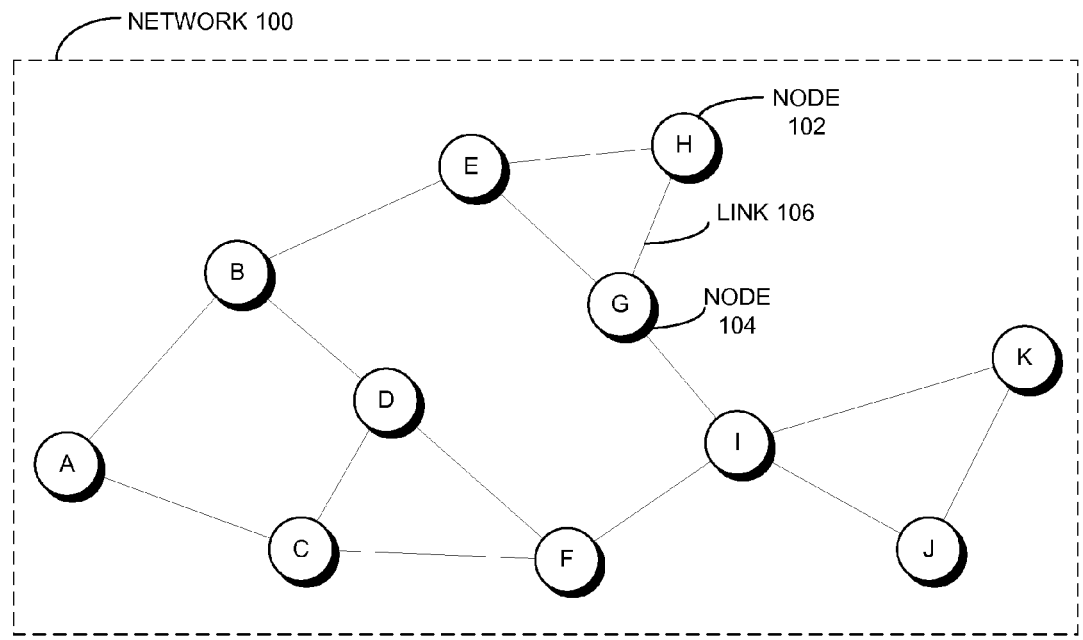
FIG. 1 illustrates an exemplary computer network implementing a mesh topology in accordance with an embodiment of the present invention.

Typical computer networks implement a mesh topology, which allows for multiple paths between two respective nodes. This mesh arrangement allows for an unnecessarily large number of redundant routing paths for a given network, which can be a source of overhead for large networks, because it requires a routing protocol to incorporate sufficient detail in the header of a data packet to identify a given routing path from the multitude of possible routing paths. FIG. 1 illustrates an exemplary computer network 100 implementing a mesh topology. Network 100 includes a number of nodes (e.g., node 102) which represent computing devices on a computer network, and includes a number of links which represent communication interconnections between nodes (e.g., link 106 coupling nodes 102 and 104).

Embodiments of the present invention provide methods and systems for implementing a network protocol which is scalable across large and small computer networks. The network protocol implements a routing tree for a computer network, and can route packets across the computer network while incurring minimal overhead, regardless of the size and network topology of the computer network. The network protocol can minimize the amount of state information that is stored at a respective node of the routing tree, and can minimize the amount of information that is required in a packet header, thereby minimizing the control overhead that affects routing performance and resource consumption.

Routing Tree

Figure 2:
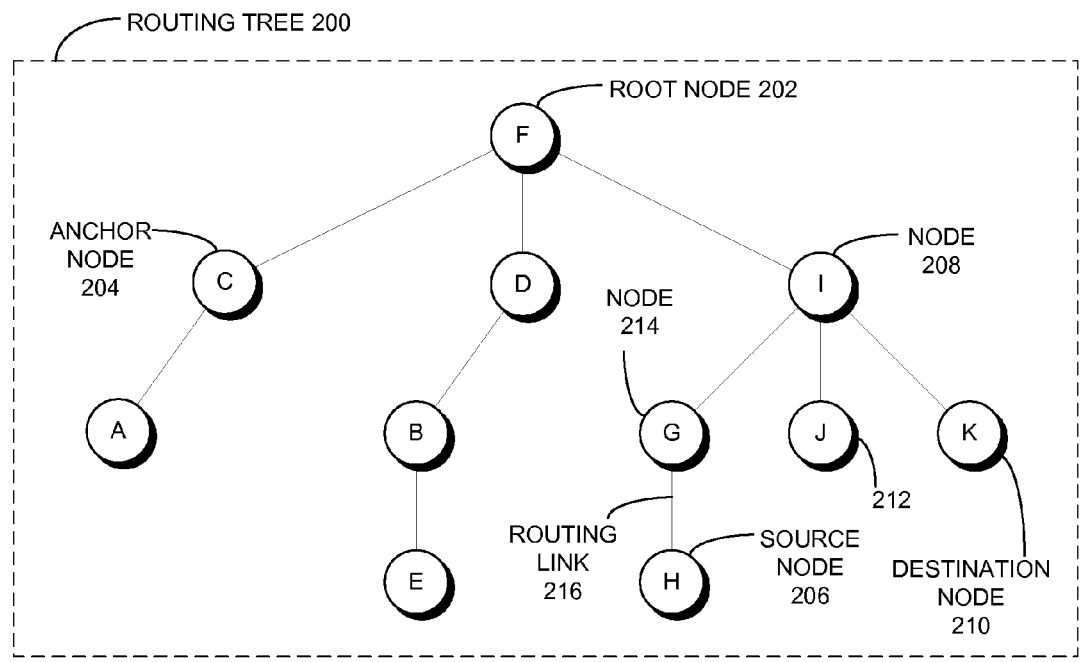
FIG. 2 illustrates an exemplary routing tree in accordance with an embodiment of the present invention.

FIG. 2 illustrates an exemplary routing tree 200, which is a network structure derived from network 100, in accordance with an embodiment of the present invention. Routing tree 200 includes a number of nodes (e.g., nodes 202-214), which represent computing devices on the computer network. Routing tree 200 also includes a number of links, which represent routing paths between nodes (e.g., routing link 216 between source node 206 and node 214). Routing tree 200 implements a tree topology, such that a respective node (e.g., node 208) can have a parent node (e.g., root node 202), and can have a number of children (e.g., nodes 210-214). Furthermore, a respective node of routing tree 200 comprises a textual node identifier which can be used to identify the node (e.g., node identifier "H" for source node 206). In variations on this embodiment, the node identifier can be a uniform resource locator (URL). In other variations, the node identifier can be any unique textual string which can facilitate identifying the respective node from a number of nodes.

Note that the tree topology for routing tree 200 allows for implementing a routing protocol which can operate by specifying routing paths to a central location, as opposed to specifying explicit routing paths between two respective nodes. Routing tree 200 designates a root node 202 as a central location for a routing path. In other words, a respective node of routing tree 200 has a positional label which describes a location for the node relative to its position from root node 202. This positional label is represented using a notation $L_{ID}$, where "ID" is a node identifier (e.g., $L_H$ is the location for source node 206 with node identifier "H").

During operation, a data packet is propagated from a source node 206 of routing tree 200 to a destination node 210 by first propagating the data packet toward root node 202 until a branch node is identified, then propagating the data packet from the branch node to destination node 210. A respective node of routing tree 200 can use its relative position with respect to root node 202 to determine a routing path for reaching root node 202. Therefore, source node 206 can determine a route for a data packet to destination node 210 by determining the relative position of destination node 210 with respect to root node 202 (i.e., positional label $L_K$ for destination node 210), which can be described with less data overhead than an explicit routing path from source node 206 to destination node 210.

In some embodiments, a node of routing tree 200 along a path from source node 206 to root node 202 can determine whether it is a branch node by analyzing the positional label for destination node 210 (i.e., positional label $L_K$). For example, node 214 can analyze positional label $L_K$ to determine that it is not on the routing path from root node 202 to destination node 210, and node 208 can similarly analyze positional label $L_K$ to determine that it is on the routing path from root node 202 to destination node 210.

In some embodiments, a routing tree 200 uses a number of anchor nodes to implement a distributed hash table, where a respective anchor node stores positional labels for a subset of the nodes of routing tree 200. During operation, source node 206 can determine a positional label which is associated with a given node identifier (e.g., positional label $L_K$ for node identifier "K") by first determining the positional label associated with an anchor node (e.g., anchor node 204) that stores the positional label for the given node identifier. To do so, source node 206 can perform a lookup in an AnchorHash function ($h_A(ID)$) to determine the positional label for anchor node 204, where $h_A(ID)$ is a hash function which accepts a node identifier as input and returns a positional label for a corresponding anchor node. After receiving the positional label for anchor node 204 from the AnchorHash function, source node 206 can use the positional label to provide anchor node 204 with the node identifier and receive the positional label for the corresponding node (e.g., destination node 210).

In some variations, the AnchorHash function is a one-way hash function. In other variations, the AnchorHash function is a reversible hash function.

Note that in yet other variations, the AnchorHash function can be implemented by any function which can identify a positional label for an anchor node based in part on a node identifier. In some embodiments, the AnchorHash function can return a positional label for an optimal anchor node from a set of anchor nodes associated with the node identifier. For example, in some embodiments, the AnchorHash function can compute a positional label for an optimal anchor node associated with the node identifier by also taking as input at least one of: a current state of the network (e.g., network load, network connectivity, etc.), a source node (e.g., positional label, user identification, etc.), a time of day, a day of week, and a date.

In some embodiments, anchor nodes for a routing tree are located near the root node of the routing tree. To achieve this, a routing tree can give nodes closest to the root node a higher likelihood for being designated as an anchor node, thereby minimizing the average distance between a source node and an anchor node.

Node

Figure 3:
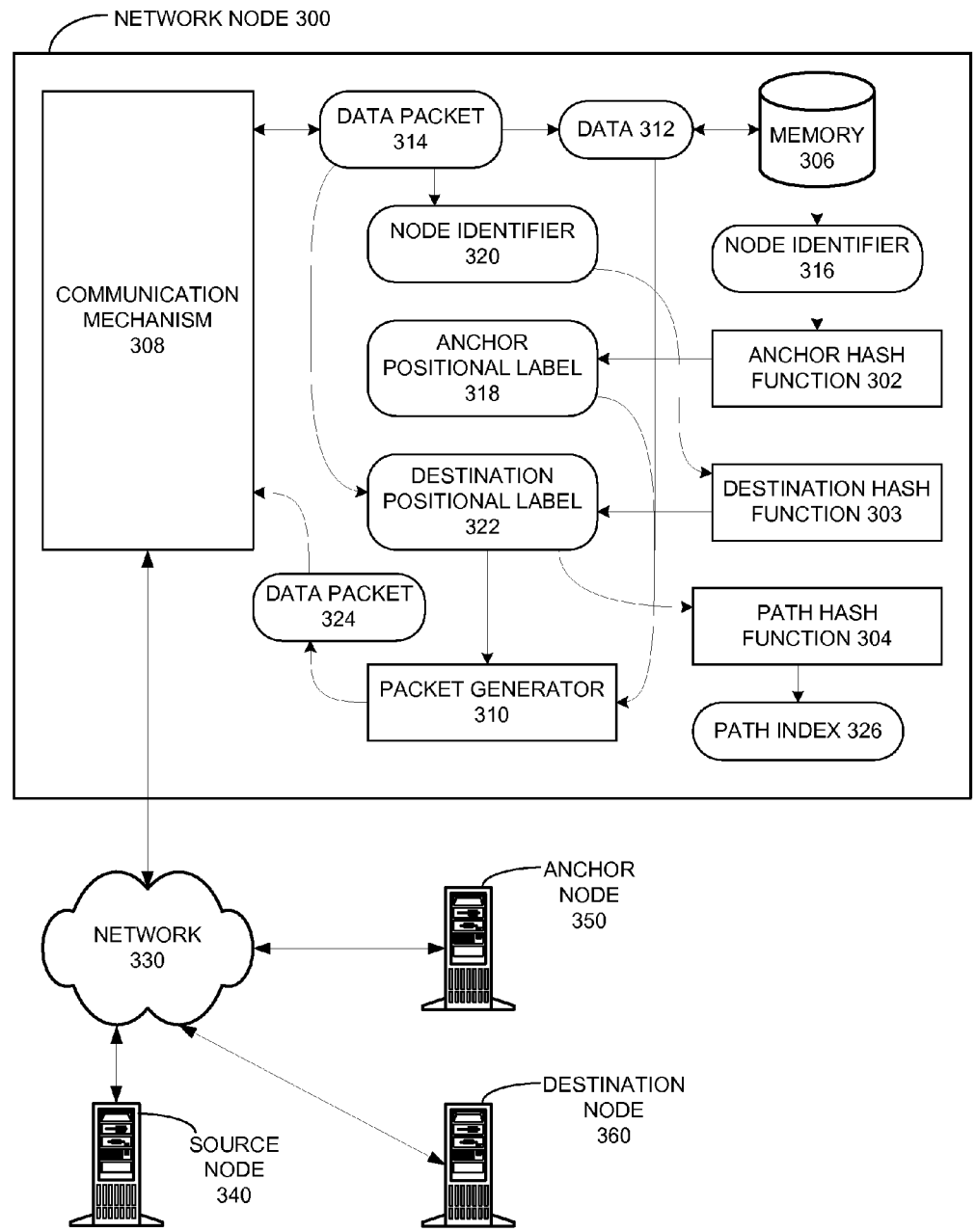
FIG. 3 illustrates a node of a routing tree in accordance with an embodiment of the present invention.

FIG. 3 illustrates a node 300 of a routing tree in accordance with an embodiment of the present invention. Node 300 can include an anchor hash function 302, a destination hash function 303, a path hash function 304, a memory device 306, a communication mechanism 308, and a packet generator 310. Anchor hash function 302, destination hash function 303, and path hash function 304 can each be implemented as a one-way hash function, a reversible hash function, or any other function which can return a desired value. Furthermore, anchor hash function 302 and destination hash function 303 take as input a string-based hash key (i.e., node identifier 316 or 320) for a node, and returns a corresponding positional label. Path hash function 304 takes as input a positional label that is associated with a routing path to identify a corresponding child of node 300. Anchor hash function 302 stores a collection of positional labels that correspond to anchor nodes, and uses node identifier 316 as a hash key to identify a corresponding anchor positional label 318. Similarly, destination hash function 303 stores a collection of positional labels that correspond to nodes that are a destination for a data packet 314, and uses node identifier 320 as a hash key to identify a corresponding destination positional label 322. Path hash function 304 uses destination positional label 322 as a hash key to compute a path index 326 which identifies a corresponding child node of node 300.

Memory device 306 can be a volatile or a non-volatile storage medium for storing data, which can store data 312 and node identifier 316. Communication mechanism 308 is configured to send and/or receive data packets from nodes 340-360 of the routing tree through a network 330. In one embodiment, network 330 includes a wireless network. In another embodiment, network 330 includes a cellular network. In a further embodiment, network 330 includes the Internet.

During runtime, node 300 can operate in any of three modes of operation. In a first mode of operation, node 300 can operate as a source node that sends data 312 to a destination node 360 associated with a node identifier 316. To do so, node 300 first uses node identifier 316 to search through anchor hash function 302 for a corresponding anchor positional label 318. Node 300 then uses node identifier 316 to query an anchor node 350 at a node location specified by anchor positional label 318, and receive a destination positional label 322 in return. Next, a packet generator 310 of node 300 generates a data packet 324 that includes data 312 and a packet header with destination positional label 322. Then, node 300 uses communication mechanism 308 to send data packet 324 to destination node 360 through network 330.

In a second mode, node 300 can operate as an anchor node on the routing tree that receives a node identifier 320 from a source node 340, and returns destination positional label 322 to source node 340 through network 330. To do so, node 300 first uses node identifier 320 to search through destination hash function 303 for a corresponding destination positional label 322. Next, a packet generator 310 of node 300 generates a data packet 324 that includes destination positional label 322 as data, and a packet header with a positional label associated with source node 340. Then, node 300 uses communication mechanism 308 to send data packet 324 to source node 340 through network 330.

In a third mode, node 300 can operate as a node that propagates a data packet 314 between source node 340 and anchor node 350 along a path in a routing tree, or between source node 340 and destination node 360 along a path in the routing tree. Node 300 first receives data packet 314 from source node 340, and analyzes a destination positional label 322 from the header of data packet 314 to determine how to propagate data packet 314 across the routing tree. If node 300 determines from positional label 322 that it is not on a routing path between the root node of the routing tree and a node associated with destination positional label 322, node 300 propagates data packet 314 to its parent node. Otherwise, if node 300 determines that it is on the routing path but it is not associated with destination positional label 322 (i.e., it is not the recipient of data packet 314), node 300 inputs destination positional label 322 from data packet 314 into path hash function 304 to determine a path index that identifies a child node to propagate data packet 314 to. Otherwise, node 300 accepts data packet 314 by storing data 312 from data packet 314 in memory 306. The following paragraphs discuss the third mode of operation in detail.

PathID Routing

Figure 4:
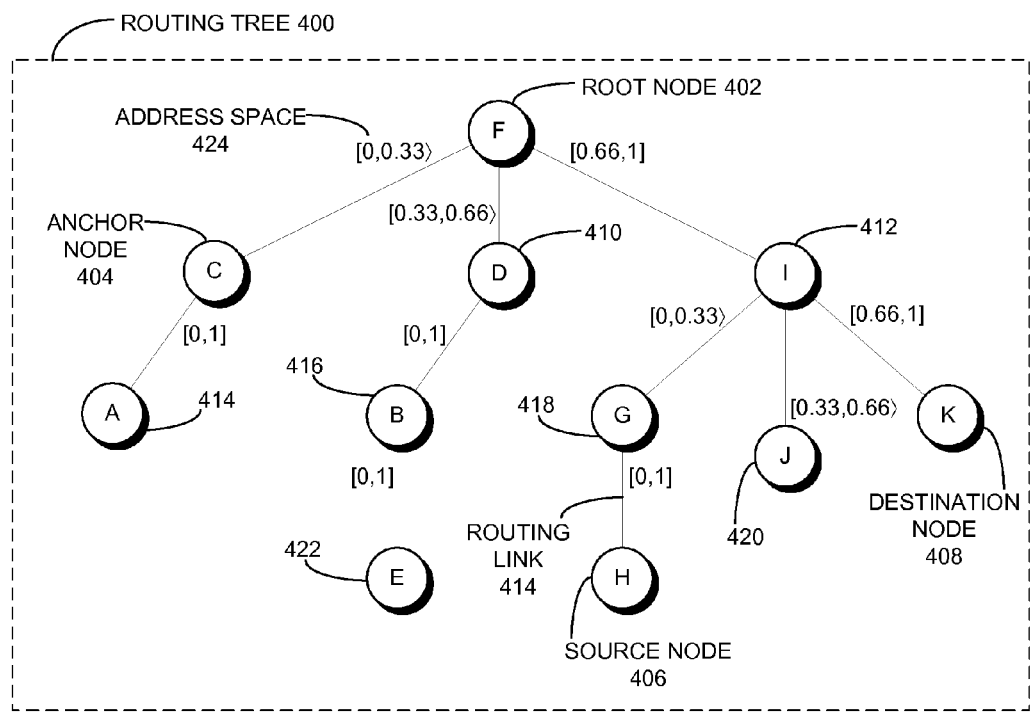
FIG. 4 illustrates network information maintained across nodes of a routing tree in accordance with an embodiment of the present invention.

FIG. 4 illustrates network information maintained across nodes of routing tree 400 to facilitate identifying a path from a root node 402 to a destination node 408 in accordance with an embodiment of the present invention. The network information maintained by a respective node includes a path distance (in nodes) from root node 402, and includes an address space (e.g., address space 424) which is allocated to the respective node by the parent. A non-leaf node assigns an address space to a respective child node when the child node joins the network, and routes a data packet to the child node when the positional label for the data packet (using the path hash function) evaluates to a path index value within the address space of the child node.

In some embodiments, a non-leaf node of routing tree 400 with k children allocates an address space across the k children by partitioning the address space into k disjoint sets, and assigning a respective address space partition to a corresponding child node. For example, root node 402 has three children (i.e., nodes 404, 410, and 412), root node 402 partitions an address space [0,1] into three address space partitions (i.e., [0,0.33), [0.33,0.66), [0.66,1]), and allocates the three partitions to its three children (i.e., nodes 404, 410, and 412, respectively). In some variations on this embodiment, an address space can be defined using integer and/or real values. In some variations, a non-leaf node partitions an address space into a set of contiguous address space partitions for a number of child nodes. In other variations, a non-leaf node maintains a set of non-contiguous address space partitions to allocate an address space partition for a new child node when necessary. In some embodiments, a non-leaf node partitions an address space into a number of evenly distributed address spaces.

TABLE 1 illustrates an addressing table, which corresponds to node 412 of FIG. 4, in accordance with an embodiment of the present invention. A non-leaf node stores address space information for its children in an addressing table. The addressing table includes a first column which specifies a number of address spaces that correspond to its children, and includes a second column which specifies a corresponding number of node identifiers. In some variations, the second column can specify a corresponding number of absolute network addresses (e.g., URLs) for the children of the non-leaf node. In other variations, the second column can specify a corresponding number of communication channels for the children of the non-leaf node.

TABLE 1

| Address Space | Node Identifier |
|---|---|
| [0, 0.33> | G |
| [0.33, 0.66> | J |
| [0.66, 1] | K |

In some embodiments, a respective node along a routing path routes a data packet toward a destination node by using a positional label from the packet to determine a subsequent node along the routing path. A positional label includes a path identifier (pathID), and includes a path distance. The pathID is a token used by the respective node to determine which adjacent node is a subsequent node along the routing path, and the path distance is a numerical value which specifies the distance of the destination node from the root node along the routing path. In some variations, the PathID value can be an integer number or a real number. In other variations, the PathID value can be a text string. In yet other variations, the PathID can be represented using a fixed-length token with a predetermined length. Furthermore, the path distance can also be represented using a fixed-length token, thereby guaranteeing that the positional label is represented using a fixed bit length.

In some embodiments, path hash functions for nodes at varying levels of a routing path can generate non-uniform solutions for a given positional label. In other words, these path hash functions at varying levels of a routing path can translate a given positional label to a different path index at varying levels of the routing path. This non-uniformity of solutions for a positional label across varying levels of a routing path increases the maneuverability of the positional label across a routing tree, thereby increasing the likelihood that a positional label exists which can reach a given destination node.

In some embodiments, the non-uniformity of solutions for a positional label across varying levels of a routing path is achieved by implementing a non-uniform set of path hash functions across the varying levels of the routing path. For example, a first path hash function for a first node of a routing path can be different than a second path hash function for a second node of the routing path, such that the first hash function and the second hash function take as input a given pathID for a given positional label, and can generate different path indexes for the given pathID.

In some embodiments, the non-uniformity of solutions for a positional label across varying levels of a routing path is achieved by implementing a uniform path hash function at the varying levels of the routing path which takes as input the pathID of the positional label and the path distance for a respective node of the routing path. In other embodiments, the non-uniformity of solutions for a positional label across varying levels of a routing path is achieved by implementing a uniform path hash function at the varying levels of the routing path which takes as input the pathID of the positional label and the node identifier for a respective node of the routing path.

Figure 5:
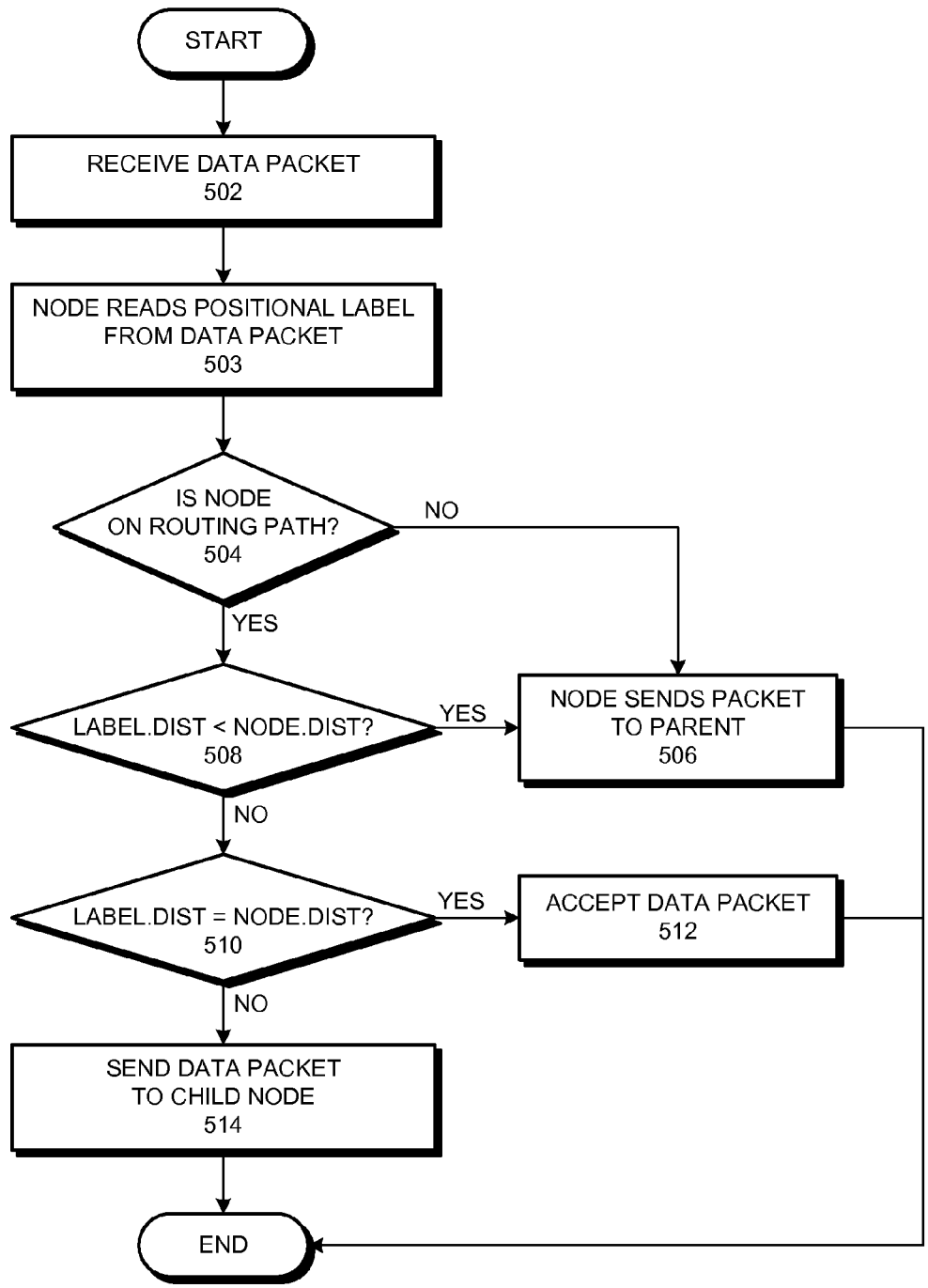
FIG. 5 presents a flow chart illustrating a process for routing a data packet at a node of a routing tree in accordance with an embodiment of the present invention.

FIG. 5 illustrates a process for routing a data packet at a node of a routing tree in accordance with an embodiment of the present invention. The node first receives a data packet (operation 502), and reads a positional label from the data packet (operation 503). Next, the node determines whether it is on the routing path associated with the positional label (operation 504). If the node determines that it is not on the routing path, the node sends the data packet to its parent node (operation 506). Otherwise, node 300 continues to analyze the path distance of the positional label to determine whether the path distance of the positional label is smaller than the path distance of the node (operation 508). If so, the node sends the data packet to its parent node (operation 506). Otherwise, the node continues to determine if the path distance of the positional label is equal to the path distance of the node (operation 510). If so, the node accepts the data packet (operation 512). Otherwise, the node continues to send the data packet to a child node which is on the routing path (operation 514).

In some embodiments, if the node determines that the path distance of the positional label is equal to a number k, and the node has a path distance greater than k, the node can notify its parent node that the data packet needs to be propagated to the $k^{th}$ node of the path. In some other embodiments, when the node is routing a data packet on an upward path toward the root node of the routing tree, the node can determine that one of its neighboring nodes in the mesh network belongs to the downward path away from the root node of the routing tree, and can propagate the data packet to the neighboring node.

Figure 6:
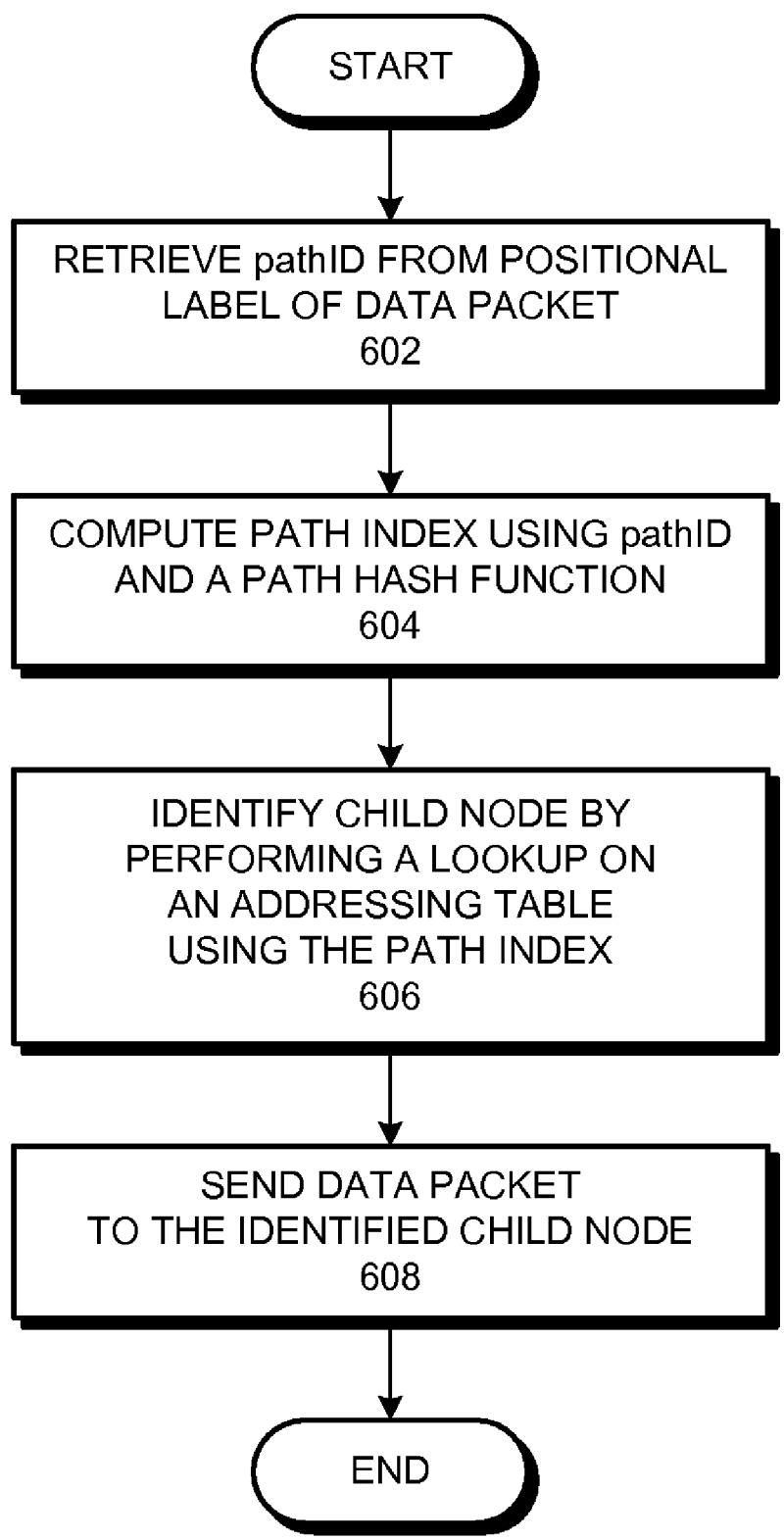
FIG. 6 presents a flow chart illustrating a process for routing a data packet to a child node of a node in accordance with an embodiment of the present invention.

FIG. 6 illustrates a process for routing a data packet to a child node of a node, which corresponds to operation 514 of FIG. 5, in accordance with an embodiment of the present invention. The node begins by retrieving the pathID from the positional label of the data packet (operation 602). Then, the system computes a path index by processing the pathID using a path hash function (operation 604). Next, the system identifies a child node with an address space that overlaps the path index by performing a lookup on an addressing table using the path index (operation 606). The system then sends the data packet to the identified child node (operation 608).

In some embodiments, a node that receives an invalid positional label (i.e., a positional label associated with a node location which does not have a corresponding node) can determine a destination node which is closest to a node location associated with the positional label. In one example, when a node receives a data packet whose positional label includes a pathID which translates into an invalid path index (i.e., the node has not allocated an address range which covers the invalid path index), the node can select a child node which has an address range nearest to the invalid path index. In a second example, when a node which has no children receives a data packet whose path distance is larger than the path distance for the node, the node can accept the data packet.

Figure 7:
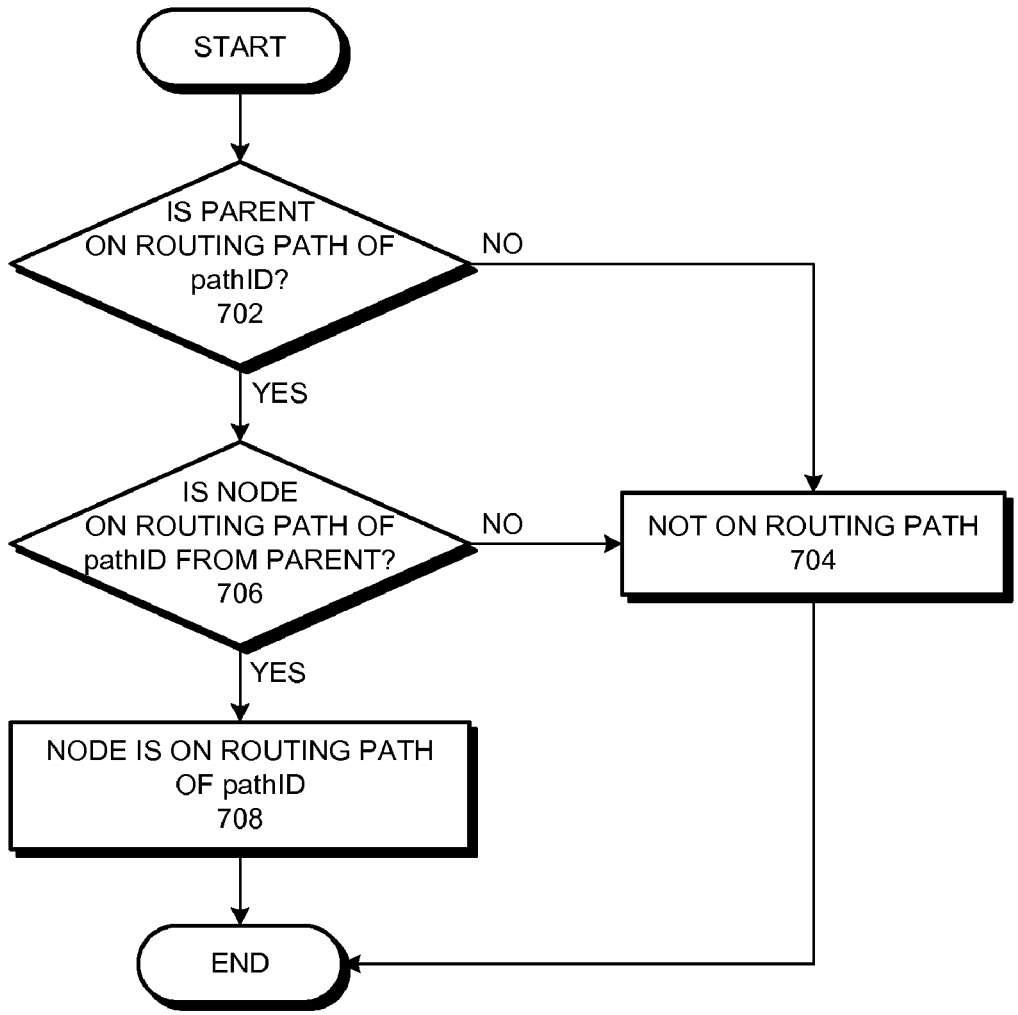
FIG. 7 presents a flow chart illustrating a process performed by a node to determine whether it is on a routing path associated with a positional label in accordance with an embodiment of the present invention.

FIG. 7 illustrates a process performed by a node to determine whether it is on a routing path associated with a positional label, which corresponds to operation 504 of FIG. 5, in accordance with an embodiment of the present invention. The node first determines whether the parent node is on the routing path associated with the pathID of the positional label (operation 702). If not, the node determines that it is not on the routing path (operation 704). Otherwise, the node continues to determine whether it is identified by the path hash function of the parent node when the pathID of the positional label is provided as input (operation 706). If not, the node determines that it is not on the routing path (operation 704). Otherwise, the system determines that it is on the routing path (operation 708).

TABLE 2 presents a pseudocode description for a basic routing algorithm in accordance with an embodiment of the present invention. The function Get_child_for_path(L,N) takes a pathID from a destination positional label L, and hashes the pathID using the path hash function ($h_p(\ )$) to determine a path index. Then, it uses local node information, N, to compare the resulting path index to a table of child address range allocations to identify a matching child, and returns a reference to the matching child.

TABLE 3 presents a pseudocode description for a function In_same_path(L,N), which determines whether a node N is a node on a routing path associated with the pathID of a positional label L (i.e., LpathID) in accordance with an embodiment of the present invention. The function In_same_path(L, N) operates by determining whether L.pathID can be used to traverse a path from the root node to node N.

TABLE 2

```
# L = Location we are routing to
# D = Data
# N = local node information
FUNC Route_Data(L,D,N)
    IF( In_same_path(L,N) )
        IF ( L.depth = N.depth )
            # Data is for us.
            Deliver_locally(D)
        ELSE
            IF( L.depth < N.depth )
                # L is above us.
                Send_To(parent,D)
            ELSE
                # L is below us.
                C = Get_child_for_path(L,N)
                Send_To(C,D)
            END
        END
    ELSE
        # We are not in the path to L
        # Move towards the root
        Send_To(parent,D)
    END
ENDFUNC
```

TABLE 3

```
# L = Location we are routing to
# N = local node information
FUNC In_same_path(L,N)
    P = predecessor_table(N)
    FOR i = 0 TO (N.depth−1) DO
        IF (Get_child_for_path(L,P[i]) IS NOT P[i+1])
            RETURN False
        END
    END
    RETURN True
ENDFUNC
```

Source Node

Figure 8:
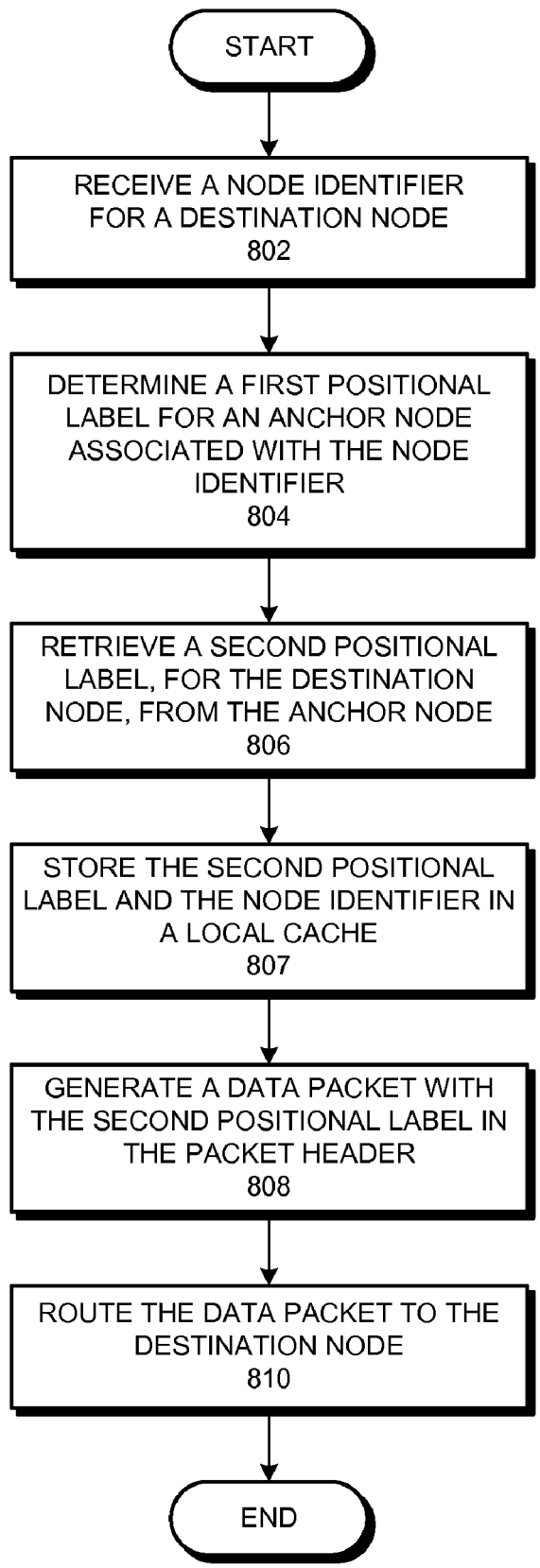
FIG. 8 presents a flow chart illustrating a process for sending a data packet from a source node to a destination node in accordance with an embodiment of the present invention.

FIG. 8 illustrates a process for sending a data packet from a source node to a destination node in accordance with an embodiment of the present invention. The source node first receives a node identifier for the destination node (operation 802). Then, the source node determines a first positional label for an anchor node associated with the node identifier by providing an anchor hash function with the node identifier as input (operation 804). Next, the source node retrieves a second positional label for the destination node from the anchor node by providing the anchor node with the node identifier (operation 806), and can store the second positional label and the node identifier in a local cache (operation 807). The source node then generates the data packet by incorporating the second positional label into the packet header of the data packet (operation 808), and continues to route the data packet to the destination node (operation 810).

In some embodiments, if an entry exists in the local cache for the node identifier, the source node can retrieve the second positional label from the local cache. By doing so, the source node can avoid operations 804-807.

Anchor Node

Figure 9:
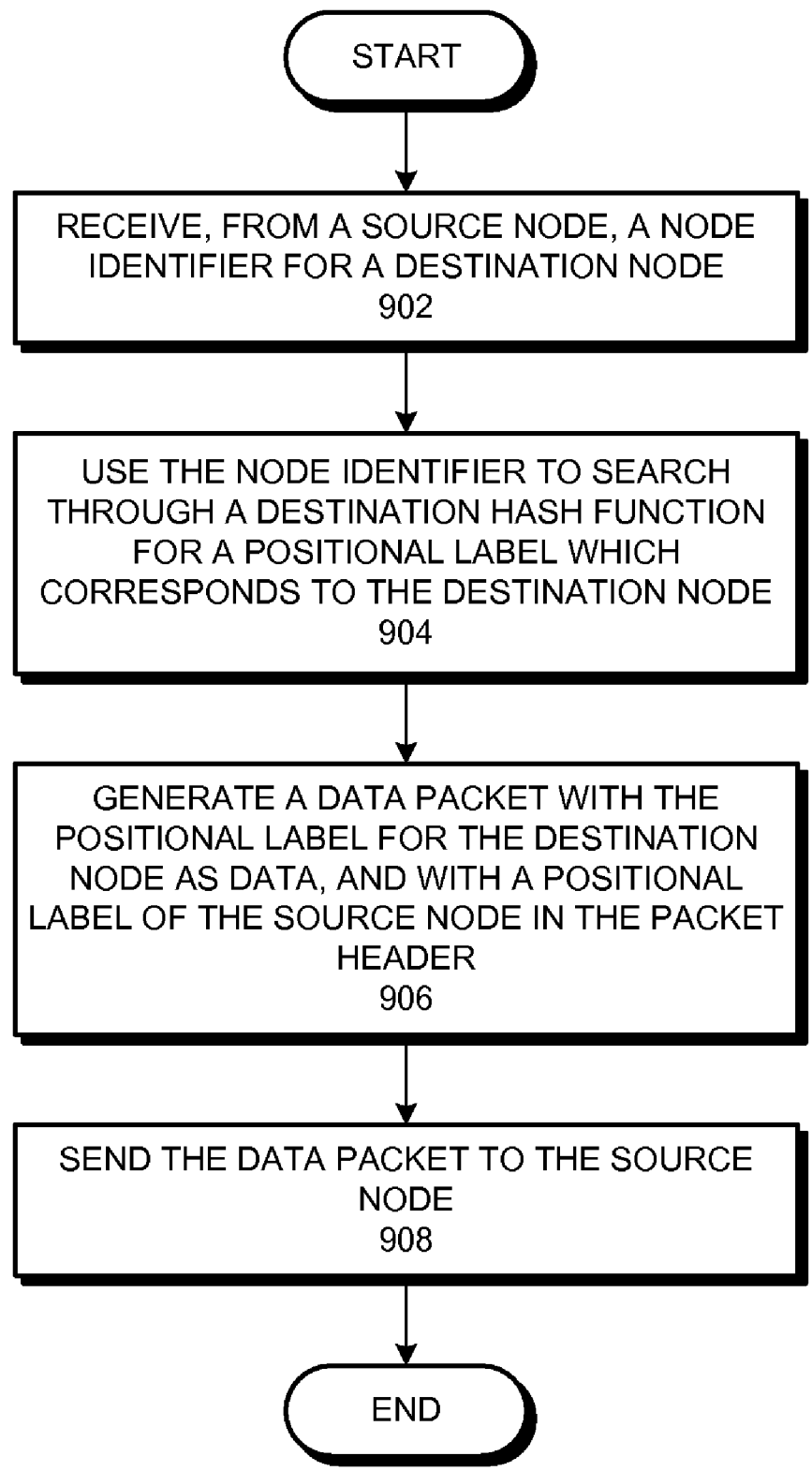
FIG. 9 presents a flow chart illustrating a process performed by an anchor node to provide a source node with a positional label for a destination node associated with a given node identifier in accordance with an embodiment of the present invention.

FIG. 9 illustrates a process performed by an anchor node to provide a source node with a positional label for a destination node associated with a given node identifier in accordance with an embodiment of the present invention. The anchor node first receives, from the source node, a node identifier for the destination node (operation 902). Then, the anchor node uses the node identifier to search through a destination hash function for a positional label which corresponds to the destination node (operation 904). Next, the anchor node generates a data packet that includes the positional label associated with the destination node as data, and a packet header with a positional label associated with the source node (operation 906). The anchor node sends the data packet to the source node through the network (operation 908).

Joining a Node onto a Routing Tree

Figure 10:
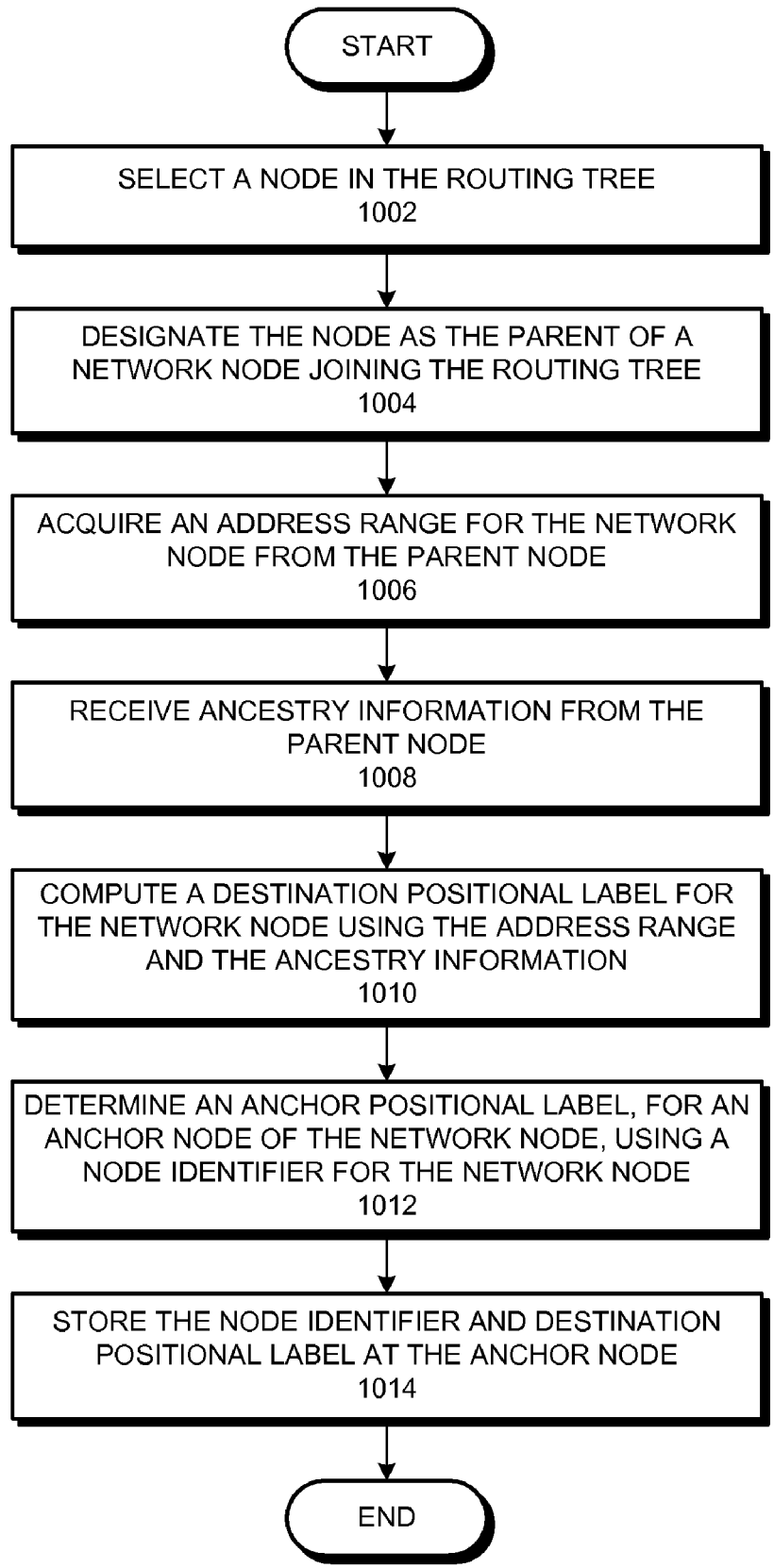
FIG. 10 presents a flow chart illustrating a process for allowing a node to join a routing tree in accordance with an embodiment of the present invention.

FIG. 10 illustrates a process for allowing a node to join a routing tree in accordance with an embodiment of the present invention. First, the node selects a second node in the routing tree which is capable of communicating with the node (operation 1002), and designates the second node as a parent node for the node (operation 1004). Then, the node acquires, from the parent node, an address range for the node (operation 1006), and receives ancestry information from the parent node (operation 1008). This ancestry information includes node identifiers, positional labels, and address range information for the set of nodes on a routing path from the root node to the parent node.

Next, the node uses the address range and the ancestry information to compute a destination positional label for reaching the node from the root node of the routing network (operation 1010). The node determines an anchor positional label for an anchor node which corresponds to its node identifier by inputting its node identifier into an anchor hash function (operation 1012). The node then stores its node identifier and its destination positional label at the anchor node (operation 1014).

Anchor Node Maintenance

In some embodiments, a node in a routing tree maintains its location information at a corresponding anchor node by periodically sending a heartbeat message across the routing tree. The heartbeat message includes the current positional label for the node, and gathers network information for the routing tree while it propagates toward the anchor node. In some embodiments, the heartbeat message can be used to gather a number of network shortcuts for reaching the node. In some embodiments, the network shortcuts can be stored at the anchor node associated with the node. In other embodiments, the network shortcuts can be stored across a routing path between the node and the root node of the routing tree.

In some embodiments, an anchor can send a heartbeat message to update its location information when its logical location has changed, or when its physical location has changed. In some embodiments, the distribution of anchor nodes for a routing tree can change when nodes enter or leave the routing tree, or when the physical locations of the nodes change.

Multiple Root Nodes

In some embodiments, a network (e.g., network node 100 of FIG. 1) can include more than one root node. Furthermore, a respective root node of the network can be the basis for a corresponding routing tree (e.g., routing tree 200 of FIG. 2). To accommodate multiple routing trees within a network, the path hash function for a network node can take as input a unique root identifier associated with a root node, and can take as input a pathID. Therefore, the path hash function can return a first child index for a pathID when using a first root node, and can return a second child index for the pathID when using a second root node. In some embodiments, the unique root identifier is the node identifier associated with the root node.

In some embodiments, a second node can route a data packet to a destination node by first retrieving a positional label from the header of the data packet, such that the positional label is relative to a root node from a set of root nodes of the network. Furthermore, the positional label includes a unique root identifier associated with the root node. Next, the second node determines whether it is on a path between the root node and the destination node based in part on the unique root identifier and on the positional label.

If the second node determines that it is not on a routing path between the root node and the destination node, the second node propagates the data packet to its parent node. Otherwise, if the second node determines that it is on the routing path but it is not associated with the positional label (i.e., it is not the recipient of the data packet), the second node identifies a child node that is on a path between the root node and the destination node by using its path hash function, and it propagates the data packet to the identified child node. Otherwise, the second node accepts the data packet by storing the data from data packet in memory.

In some embodiments, the second node can determine whether it is on a routing path between the root node and the destination node by first determining whether its parent node is on the routing path associated with the positional label. If not, the second node determines that it is not on the routing path. Otherwise, the second node continues to determine whether it is identified by the path hash function of the parent node when the pathID of the positional label and the unique root identifier are provided as input. If not, the second node determines that it is not on the routing path. Otherwise, the system determines that it is on the routing path.

Node

Figure 11:
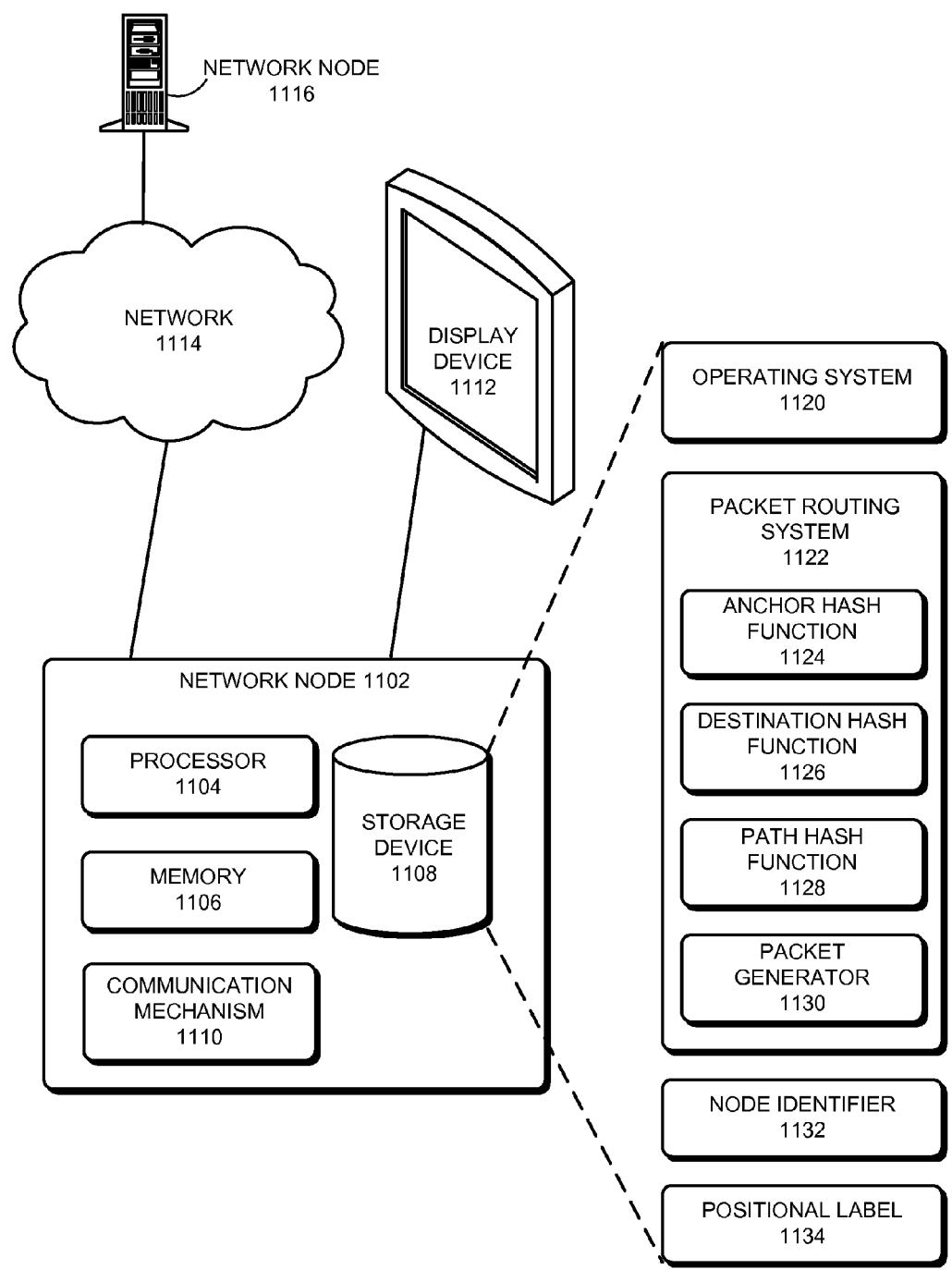
FIG. 11 illustrates an exemplary node that facilitates routing a data packet across a network in accordance with an embodiment of the present invention.

FIG. 11 illustrates an exemplary node 1102 that facilitates routing a data packet across a network 1114 in accordance with an embodiment of the present invention. Node 1102 includes a processor 1104, a memory 1106, a storage device 1108, and a communication mechanism 1110. Furthermore, node 1102 can be coupled to a network 1114 and a display device 1112. Also coupled to network 1114 is a node 1116. In one embodiment, network 1114 includes the Internet.

Storage device 1108 stores an operating system 1120, a packet routing system 1122, a node identifier 1132, and a positional label 1134. During operation, packet routing system 1122 is loaded from storage device 1108 into memory 1106 and executed by processor 1104. In one embodiment, packet routing system 1122 uses anchor hash function 1124 to compute a positional label 1134 for an anchor node associated with node identifier 1132. In another embodiment, packet routing system 1122 uses destination hash function 1126 to compute a positional label 1134 for a destination node corresponding to node identifier 1132. In another embodiment, packet routing system 1122 processes positional label 1134 of a data packet using path hash function 1128 to determine how to propagate the data packet through a routing tree. In a further embodiment, packet routing system 1122 uses packet generator 1130 to generate a data packet with positional label 1134 in the packet header, and node 1102 uses communication mechanism 1110 to propagate the data packet along a route toward a node 1116 associated with positional label 1134.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for communicating a data packet from a first node in a network to a target node, comprising:
   receiving a node identifier for the target node;
   determining a first positional label, based on the node identifier, for reaching a first anchor node from a root node in a tree topology of the network;
   retrieving a second positional label for reaching the target node from the first anchor node in the tree topology, wherein the second position label comprises: a path identifier which determines whether a respective child node is on a routing path, and a path distance value which specifies a distance from the root node to the target node along the routing path;
   determining that the distance from the first node to the root node is less than or equal to the path distance value of the second position label; and
   communicating the data packet to the target node based on the path identifier and path distance value in the second positional label.

2. The method of claim 1, wherein a respective positional label facilitates computing a routing path from the root node to a corresponding destination node.

3. The method of claim 1, wherein communicating the data packet to the target node comprises:
   determining whether the first node is on a routing path associated with the second positional label;
   if not, communicating the data packet to the parent node of the first node;
   otherwise,
   if the determined distance between the root node and the first node is equal to the path distance specified by the second positional label, accepting the data packet; and
   otherwise, identifying a child node of the first node that is on the routing path associated with the second positional label by inputting the path identifier of the second positional label into a first function which identifies the child node, and communicating the data packet to the identified child node.

4. The method of claim 3, wherein determining whether the first node is on the routing path associated with the second positional label comprises:
   determining whether the parent node of the first node is the root node, or the parent node is on the routing path associated with the second positional label;
   determining whether the distance between the root node and the first node is less than or equal to the path distance specified by the second positional label; and
   determining whether the first node is identified by the first function of the parent node when the path identifier of the second positional label is provided as input.

5. The method of claim 2, wherein the path identifier is of fixed length.

6. The method of claim 1, further comprising, when operating as an anchor node, providing the second positional label to a source node by:
   receiving the node identifier from the source node;
   inputting the node identifier into a second function to receive the second positional label; and
   communicating the second positional label to the source node.

7. The method of claim 1, wherein determining the first positional label for the first anchor node comprises inputting the node identifier into a function, and wherein the function is a global function accessible to the number of nodes in the network.

8. The method of claim 7, further comprising allowing a second node to join the network by:
   selecting a third node in the network which is capable of communicating with the second node;
   designating the third node as a parent node for the second node;
   gathering ancestry information from the parent node, wherein the ancestry information includes positional labels for the set of nodes on a routing path from the root node to the parent node;
   computing a third positional label, based in part on the ancestry information, for reaching the second node from the root node;
   determining a fourth positional label, by inputting a node identifier for the second node into the function, for reaching a second anchor node from the root node in the network; and
   storing the node identifier for the second node and the third positional label at the second anchor node.

9. The method of claim 1, further comprising storing the node identifier and the second positional label in a local cache, thereby facilitating further transfer of data packets to the target node without communicating with the first anchor node.

10. A non-transitory computer-readable storage medium storing instructions that when executed by a computer cause the computer to perform a method for communicating a data packet from a first node in a network to a target node, the method comprising:
    determining a first positional label, based on the node identifier, for reaching a first anchor node from a root node in a tree topology of the network;
    retrieving a second positional label for reaching the target node from the first anchor node in the tree topology, wherein the second position label comprises: a path identifier which determines whether a respective child node is on a routing path, and a path distance value which specifies a distance from the root node to the target node along the routing path
    determining that the distance from the first node to the root node is less than or equal to the path distance value of the second position label; and
    communicating the data packet to the target node based on the path identifier and path distance value in the second positional label.

11. The non-transitory computer-readable storage medium of claim 10, wherein a respective positional label facilitates computing a routing path from the root node to a corresponding destination node.

12. A computing device for communicating a data packet from a first node in a network to a target node, comprising:
 a processor;
 a communication mechanism configured to receive a node identifier for the target node; and
 a computation mechanism configured to determine a first positional label, based on the node identifier, for reaching a first anchor node from a root node in a tree topology of the network;
 wherein the communication mechanism is further configured to retrieve a second positional label for reaching the target node from the first anchor node in the tree topology, wherein the second position label comprises: a path identifier which determines whether a respective child node is on a routing path, and a path distance value which specifies a distance from the root node to the target node along the routing path;
 wherein the computation mechanism is further configured to determine that the distance from the first node to the root node is less than or equal to the path distance value of the second position label; and
 wherein the communication mechanism is further configured to communicate the data packet to the target node based on the path identifier and the path distance value in the second positional label.

13. The computing device of claim 12, wherein a respective positional label facilitates computing a routing path from the root node to a corresponding destination node.

14. The computing device of claim 12, wherein communicating the data packet to the target node comprises:
 determining whether the first node is on a routing path associated with the second positional label;
 if not, communicating the data packet to the parent node of the first node;
 otherwise,
 if the determined distance between the root node and the first node is equal to the path distance specified by the second positional label, accepting the data packet; and
 otherwise, identifying a child node of the first node that is on the routing path associated with the second positional label by inputting the path identifier of the second positional label into a first function which identifies the child node, and communicating the data packet to the identified child node.

15. The computing device of claim 14, wherein determining whether the first node is on the routing path associated with the second positional label comprises:
 determining whether the parent node of the first node is the root node, or the parent node is on the routing path associated with the second positional label;
 determining whether the distance between the root node and the first node is less than or equal to the path distance specified by the second positional label; and
 determining whether the first node is identified by the first function of the parent node when the path identifier of the second positional label is provided as input.

16. The computing device of claim 13, wherein the path identifier is of fixed length.

17. The computing device of claim 12, wherein the computation mechanism is further configured to provide the second positional label to a source node, when operating as an anchor node, by:
 receiving the node identifier from the source node;
 inputting the node identifier into a second function to receive the second positional label; and
 communicating the second positional label to the source node.

18. The computing device of claim 12, wherein determining the first positional label for the first anchor node comprises inputting the node identifier into a function, and wherein the function is a global function accessible to the number of nodes in the network.

19. The computing device of claim 18, wherein the computation mechanism is further configured to allow a second node to join the network by:
 selecting a third node in the network which is capable of communicating with the second node;
 designating the third node as a parent node for the second node;
 gathering ancestry information from the parent node, wherein the ancestry information includes positional labels for the set of nodes on a routing path from the root node to the parent node;
 computing a third positional label, based in part on the ancestry information, for reaching the second node from the root node;
 determining a fourth positional label, by inputting a node identifier for the second node into the function, for reaching a second anchor node from the root node in the network; and
 storing the node identifier for the second node and the third positional label at the second anchor node.

20. The computing device of claim 12, further comprising a local cache configured to store the node identifier and the second positional label, wherein the local cache facilitates further transfer of data packets to the target node without communicating with the first anchor node.

\* \* \* \* \*